United States Patent Office 2,727,025
Patented Dec. 13, 1955

2,727,025

UREA ADDUCTS OF POLYOL ESTERS

Alfred W. Weitkamp, Lansing, Ill., assignor to Standard Oil Company, Chicago, Ill., a corporation of Indiana No Drawing. Application November 16, 1951,
Serial No. 256,820

13 Claims. (Cl. 260—96.5)

This invention relates to a new class of chemical compositions having a unique combination of properties. More particularly, it relates to urea adducts of carboxylic-acid esters of straight-chain polyol compounds.

This application is a continuation-in-part of my joint application with Wilford J. Zimmerschied, Serial No. 146,932, filed February 28, 1950, now abandoned.

It is well know that urea forms solid adducts with the broad class of straight-chain organic compounds having six or more carbon atoms in the molecule. In general, however, the occurrence of a substituent group on the carbon chain prevents adduct formation with urea.

I have now discovered that urea forms stable adducts with a certain class of monoesters and diesters of straight-chain polyhydroxy compounds and straight-chain monocarboxylic acids, namely, terminally esterified compounds having at least four methylene groups in the molecule. The resulting adducts are readily obtained as fine, white, free-flowing, non-hygroscopic powders of wide utility in a variety of applications.

One object of my invention is to prepare urea and certain polyol esters in a form whereby their joint use is facilitated. Another object is to stabilize unsaturated esters against oxidation or other types of degradation. A further object is to facilitate the use of urea as a plant food. A still further object is to provide an improved method for the application of germicidal and fungicidal substances. An additional object is to prepare urea and certain defined esters in a convenient form for storing, transporting, standardizing, measuring, blending, and applying. A subsidiary object is to separate esters of the defined class from admixture with urea-unreactive compounds. Other objects of my invention will be apparent from the present description thereof.

The new urea adducts of my invention contain urea and a terminal monoester or a terminal diester of a straight-chain polyhydroxy compound and a straight-chain monocarboxylic acid, said ester containing at least four methylene groups in the molecule. By "terminal monoester" is meant a compound in which a single hydroxyl group of the polyhydroxy compound is esterified with an acid of the defined class, said hydroxyl group being terminally located in said polyhydroxy compound; by "terminal diester" is meant a compound in which two hydroxyl groups of the polyhydroxy compound are esterified, both of said hydroxyl groups being terminally located. It is to be understood that both classes of esters may include unesterified hydroxyl groups, and that such groups may be located on either the polyol nucleus or the acid nucleus. Suitable straight-chain polyhydroxy compounds from which the defined esters can be formed include ethylene glycol, diethylene glycol, triethylene glycol, higher polyethylene glycols, propylene glycol, trimethylene gycol, 1,2-butanediol, 1,3-butanediol, tetramethylene glycol, pentamethylene glycol, hexamethylene glycol, higher polymethylene glycols, glycerol, erythritol, sorbitol, and the like, and unsaturated analogues thereof. Suitable acids from which the defined esters can be prepared include acetic, propionic, butyric, valeric, caproic, caprylic, pelargonic, capric, myristic, palmitic, oleic, linoleic, linolenic, stearic, arachidic, and mellissic acids, and the like, including the unsaturated analogues thereof. Thus, my new compositions include urea adducts of ethylene glycol caproate, ethylene glycol dicaproate, ethylene glycol dicaprylate, 2-hydroxylbutyl caproate, 3-hydroxylbutyl pelargonate, diethylene glycol monocaprate, diethylene glycol dicaprate, polyethylene glycol dibutyrate, trimethylene glycol dimyristate, hexamethylene glycol monopalmitate, α-glycerol monooleate (also termed 1-glycerol monooleate or 2,3-dihydroxypropyl oleate), α,α'-glycerol dioleate (also termed 1,3-glycerol dioleate or 1,3-dioleoxy-2-propanol), 1-glycerol monolinoleate, 1,3-glycerol dilinolenate, 1-glycerol monostearate, 1-erythritol monostearate, 1,6-sorbitol distearate, and the like.

In preparing my new compositions, the charging-stock ester is commingled and agitated under urea-adduct-forming conditions with a suitable quantity of urea, and the resulting solid adduct is separated from the reaction mixture, washed, and dried.

Before urea treatment, the charging-stock ester may first be diluted with an inert organic solvent therefor, such as a branched-chain, naphthenic, or aromatic hydrocarbon, having substantially no reactivity with or solvency for urea. This is especially desirable where the charging stock is a viscous liquid or a solid, is order to facilitate contact between the charging stock and the urea. The adduct, after being separated from the reaction mixture, may be washed with an inert organic liquid of the same class, in order to remove occluded mother liquor therefrom.

The adduct-forming reaction may advantageously be carried out in the presence of a urea solvent as an activator, preferably water, methanol, ethanol, acetone, propionaldehyde, or other lower aliphatic alcohol, lower aliphatic aldehyde, or lower aliphatic ketone. Other organic oxygenated compounds may also be used as urea activators, such as butyl acetate, ethyl ether, methyl isobutyl ketone, valeraldehyde, 2-ethyl-1-hexanol, and the like; but they are not in general as effective as the preferred activators recited above. The proportion of activator to urea may range up to the quantity required to form a saturated solution of urea therein. Excellent results may be obtained, for example, within the molar range of about 0.05:1 to 1:1, but best results are ordinarily obtained between about 0.1:1 and 0.6:1. The reaction temperature is not a critical variable, but must be high enough to maintain the charging stock in liquid form, and low enough to avoid melting and decomposing the urea adduct. Temperatures between about 0 and 90° C. are ordinarily satisfactory, but I prefer to operate between about 20 and 75° C. The time of contact between the urea and the charging stock is likewise not a critical variable. Adduct formation begins to take place almost instantaneously when the reactants are mixed, and may be virtually complete in as little as 0.1 hour in some cases, especially when a urea activator is employed. I prefer in general to contact the reactants for a reaction period ranging from about 0.25 to 1.0 hour in order to insure substantially complete reaction between urea and the desired ester constituent of the charging stock.

In the formation of urea adducts with the defined class of esters, at least three moles of urea are ordinarily required for every four carbon atoms in the molecule, where the ester is completely saturated; and in any case, not more than one mole of urea is required for every methylene group.

The reaction described above may conveniently be employed as a means of separating esters of the defined class from admixture with other organic materials which do not form adducts or otherwise react with urea. When the reaction is employed for this purpose, it is sometimes desirable to decompose the resulting adduct in order to regenerate and recover the ester therefrom in purified form. Decomposition of the adduct to liberate the ester may be effected by dissolving the adduct in an excess of a urea solvent, such as water, methanol, ethanol, acetone, or the like, at a temperature above the melting point of the adducted ester. I prefer to use water, since the ester liberated thereby stratifies as a second phase from the resulting aqueous solution of urea, and may conveniently be withdrawn. Alternatively, I may decompose the adduct by steam distillation, by distillation with a hot dry gas, by simple dry distillation preferably under vacuum, by washing with a hot organic solvent for the adducted ester, preferably between about 70 and 125° C., or by other techniques disclosed in the art. In all cases, the liberated ester may be further purified by conventional means, such as fractional distillation, fractional crystallization, or the like.

Straight-chain esters, saturated and unsaturated, are capable of forming solid adducts with urea under the conditions set forth above, if they have a minimum of four methylene groups in the molecule. It is emphasized that the class of urea-reactive esters includes the following subgeneric groups: hydroxy esters derived from aliphatic glycols, diesters derived from aliphatic glycols, monoglycerides, diglycerides, and the like.

My new compositions are white, finely divided, free-flowing powders, stable and non-hygroscopic in storage. They are therefore convenient to store and transport in open drums or paper packages. They can be easily standardized on a weight basis. They can be easily blended with other dry substances, and can readily be dissolved in water or organic solvents for application wherever desired. Thus, my new compositions represent a highly advantageous combination of urea and the defined class of esters for application wherever the combined properties of the constituent components are desired. For example, urea is effective as a plant food, and the defined esters are effective as mild emulsifying, wetting, and spreading agents. The combination is therefore highly advantageous in the preparation of suspensions of insecticidal and fungicidal agents for application to plants.

An especially efficacious group of my new compositions are the urea adducts of the monoglycerides and diglycerides of the straight-chain aliphatic monocarboxylic acids containing twelve or more carbon atoms in the molecule. The urea adducts of 1-glycerol monooleate and of 1,3-glycerol dioleate are specific examples of such compositions. The said glycerides are weak emulsifying agents, and for this reason the adducts thereof are effective for producing a quick-breaking emulsifiable insecticidal spray composition for application to the foliage of fruit trees as a means of simultaneously controlling codling moths, aphids, and other insects, for supplying a general nutrient, and for improving the fruit set. The urea adduct can be conveniently dissolved in water in the field immediately prior to the application thereof. Furthermore, my new composition makes glycerol oleates available in a stable form for the first time, since autooxidation thereof is completely inhibited in my new urea adducts.

My invention is illustrated by the following specific examples:

*Example I*

A solution of 5 grams of diethylene glycol laurate in 7 milliliters of methanol was shaken with 50 milliliters of a saturated solution of urea in methanol at room temperature. A copious precipitate formed instantly, and was separated by filtration. The adduct was washed with ethyl ether and dried. On analysis, it was found to contain 33.7 percent nitrogen, equivalent to 13.7 moles of urea per mole of ester.

*Example II*

Diethylene glycol oleate reacted instantly with urea as in Example I to form a copious precipitate. The adduct was found to contain 34.4 percent nitrogen, equivalent to 15.5 moles of urea per mole of ester.

*Example III*

A mixture of 100 grams of commercial glycerol "monooleate" (approximately 50:50 monooleate and dioleate) was stirred with 400 grams of powdered urea. The temperature rose from an initial level of 25° C. to a maximum of 35° C. After standing overnight, the adduct was filtered from the reaction mixture and washed three times with 300-milliliter portions of hexane and three times with ethyl ether. Only six percent of the original ester was recovered from the wash liquid; this portion was identified as largely glycerol trioleate. The recovered adduct was a white, dry, finely divided powder. On dissociating the adduct with water and extracting with ether, 94 percent of the original ester was recovered.

*Example IV*

"Polyethylene glycol dioleate 200" (a commercial product made from polyethylene glycol of molecular weight 200) reacted slowly with urea as in Example I to form a precipitate. The adduct, on being washed, dried, and analyzed, was found to contain 32.8 percent nitrogen, equivalent to 25.0 moles of urea per mole of ester.

*Example V*

A quantity of the monolaurate of 300 molecular weight polyethylene glycol was mixed with urea in the proportion of 5 grams of ester to 15 grams of urea. A reaction occurred, and the temperature rose between 2 and 3° C. The reaction mixture was filtered, the solids were washed with ether and hexane, and a urea adduct of the starting ester was obtained in small yield.

All of the various products prepared in the above examples were found to sinter and decompose when heated to about 127° C., with complete liquefaction around the melting point of urea (132.7° C.).

While I have described my invention with reference to a number of specific embodiments thereof, it is to be understood that I am not limited to the charging stocks, manipulative steps, or process conditions employed therein. My invention is to be construed broadly within the scope of the description and claims, and any modifications or equivalents that would ordinarily occur to one skilled in the art are to be considered as lying within the scope of my invention.

In accordance with the foregoing description, I claim as my invention:

1. An adduct of urea and an ester selected from the group consisting of terminal monoesters and terminal diesters of a straight-chain polyol and a straight-chain aliphatic monocarboxylic acid, said ester having at least four methylene groups in the molecule.

2. An adduct of urea and an ester selected from the group consisting of terminal monoesters and terminal diesters of glycerol and a straight-chain aliphatic monocarboxylic acid, said ester having at least four methylene groups in the molecule.

3. An adduct of urea and a 1-glycerol monoester of a straight-chain aliphatic monocarboxylic acid, said ester having at least four methylene groups in the molecule.

4. An adduct of urea and a 1,3-glycerol diester of a straight-chain aliphatic monocarboxylic acid, said ester having at least four methylene groups in the molecule.

5. An adduct of urea and a terminal monoester of a straight-chain glycol and a straight-chain aliphatic monocarboxylic acid, said ester having at least four methylene groups in the molecule.

6. An adduct of urea and a terminal diester of a polymethylene glycol and a straight-chain aliphatic monocarboxylic acid, said ester having at least four methylene groups in the molecule.

7. An adduct of urea and an ester selected from the group consisting of terminal monoesters and terminal diesters of a straight-chain polyethylene glycol and a straight-chain aliphatic monocarboxylic acid, said ester having at least four methylene groups in the molecule.

8. An adduct of urea and an ester selected from the group consisting of monoesters and diesters of ethylene glycol and a straight-chain aliphatic monocarboxylic acid, said ester having at least four methylene groups in the molecule.

9. An adduct of urea and an ester selected from the group consisting of terminal monoesters and terminal diesters of a straight-chain polyol and a straight-chain aliphatic monocarboxylic acid, said acid having at least twelve carbon atoms in the molecule.

10. An adduct of urea and an ester selected from the group consisting of terminal monoesters and terminal diesters of glycerol and a straight-chain aliphatic monocarboxylic acid, said acid having at least twelve carbon atoms in the molecule.

11. An adduct of urea and 1-glycerol monooleate.
12. An adduct of urea and 1,3-glycerol dioleate.
13. An adduct of urea and a diethylene glycol oleate.

References Cited in the file of this patent

UNITED STATES PATENTS

| | | |
|---|---|---|
| 2,520,716 | Fetterly | Aug. 29, 1950 |
| 2,557,257 | Melrose | June 19, 1951 |
| 2,594,481 | Bowman et al. | Apr. 29, 1952 |
| 2,642,423 | Gorin | June 16, 1953 |
| 2,700,036 | Bradley et al. | Jan. 18, 1955 |